United States Patent
Fukuzawa

(10) Patent No.: US 8,319,392 B2
(45) Date of Patent: Nov. 27, 2012

(54) MOTOR

(75) Inventor: Hisashi Fukuzawa, Nagano (JP)

(73) Assignee: Nidec Sankyo Corporation (JP)

( * ) Notice: Subject to any disclaimer, the term of this patent is extended or adjusted under 35 U.S.C. 154(b) by 300 days.

(21) Appl. No.: 12/774,860

(22) Filed: May 6, 2010

(65) Prior Publication Data

US 2011/0121679 A1     May 26, 2011

(30) Foreign Application Priority Data

Nov. 25, 2009    (JP) ................................. 2009-268046

(51) Int. Cl.
*H02K 1/14* (2006.01)
*H02K 37/14* (2006.01)

(52) U.S. Cl. ..................................... 310/257; 310/49.16

(58) Field of Classification Search .... 310/49.01–49.02, 310/49.09–49.11, 49.15–49.21, 49.22–49.23, 310/49.35, 257
See application file for complete search history.

(56) References Cited

U.S. PATENT DOCUMENTS

| | | | | |
|---|---|---|---|---|
| 4,794,292 A | * | 12/1988 | Torisawa | 310/257 |
| 6,133,666 A | * | 10/2000 | Hollenbeck et al. | 310/216.079 |
| 7,466,058 B2 | * | 12/2008 | Dubois et al. | 310/257 |
| 7,714,475 B2 | * | 5/2010 | Enomoto et al. | 310/216.067 |
| 7,843,106 B2 | * | 11/2010 | Huang | 310/257 |
| 7,977,828 B2 | * | 7/2011 | Fukuzawa | 310/49.16 |

FOREIGN PATENT DOCUMENTS

| | | | |
|---|---|---|---|
| EP | 1876692 A1 | * | 1/2008 |
| JP | 2000-350431 A | | 12/2000 |
| JP | 2002027727 A | * | 1/2002 |
| JP | 2005124378 A | * | 5/2005 |

* cited by examiner

*Primary Examiner* — Tran Nguyen

(74) *Attorney, Agent, or Firm* — Cantor Colburn LLP

(57) ABSTRACT

A motor may include a stator provided with a yoke having a plurality of pole teeth and an exciting coil and a rotor disposed in a circular space surrounded by the pole teeth. A portion where a difference between an inner side area of the pole tooth facing the rotor and an outer side area of the pole tooth facing the exciting coil is larger than a difference between the inner side area and the outer side area of the pole tooth where both circumferential direction faces of the pole tooth are formed in faces coincided with normal lines may be provided on a root part of the pole tooth. Further, circumferential direction faces of at least a root part of the pole tooth are formed so as to face the rotor in an inclined manner.

20 Claims, 7 Drawing Sheets

PRIOR ART

PRIOR ART under Title Page: US 8,319,392 B2

MOTOR

CROSS REFERENCE TO RELATED APPLICATION

The present invention claims priority under 35 U.S.C. §119 to Japanese Application No. 2009-268046 filed Nov. 25, 2009, the entire contents of which are incorporated herein by reference.

FIELD OF THE INVENTION

An embodiment of the present invention may relate to a motor.

BACKGROUND OF THE INVENTION

Conventionally, in a motor such as a small synchronous motor, a stepping motor or the like, a stator is used in which a plurality of pole teeth is arranged in a circumferential direction. In a case of a stepping motor, the pole teeth are commonly formed in a trapezoid shape (see Japanese Patent Laid-Open No. 2000-350431). This is because, when the pole teeth are formed in a rectangular shape, the detent torque becomes stronger, the cogging is increased and a smooth rotation is not attained. Therefore, the pole teeth are formed in a trapezoid shape.

In other words, as shown in FIGS. 12 and 13, the stator yoke 101 in a conventional stepping motor is provided with a plurality of pole teeth 102, which is formed in a trapezoid shape and which is juxtaposedly arranged in a circumferential direction. In this example, the pole teeth 102 are juxtaposed in the circumferential direction so as to surround the center line 104 which passes the center of a circular space 103 surrounded by the plurality of the pole teeth 102. A rotor is disposed in the circular space 103 and an exciting coil is wound around an outer periphery of the pole teeth 102. Further, a circumferential direction face 105 which is a side face of each of the pole teeth 102 formed in a trapezoid shape is, as shown in FIG. 13, formed in a face coincided with a normal line 106 with respect to the center line 104.

FIG. 14 shows a state which one of the pole teeth 102 is viewed from the rotor side. As shown in FIG. 14, in a case when the circumferential direction faces 105 of the pole tooth 102 are formed as faces coincided with the normal line 106 with respect to the center line 104, an external shape of the rotor side face of the pole tooth 102 is a complete trapezoid and an external shape of its exciting coil side face is also a complete trapezoid. The face on the exciting coil side of the pole tooth 102 is located to the outer peripheral side of the rotor side face and thus, when the pole tooth 102 is viewed from the rotor side, both the circumferential direction faces 105 of the pole tooth 102 can be seen on the outer sides in the circumferential direction of the rotor side face. In FIG. 14, a circumferential direction width "W62" which is a width dimension in the circumferential direction of the circumferential direction face 105 of a tip end part 108 side of a pole tooth 102 is formed to be smaller than a circumferential direction width "W61" of its root part 107 side, and the circumferential direction width "W61" becomes narrower proportionally as it goes to the tip end side and the width of the tip end part 108 is the circumferential direction width "W62".

However, in the case of the pole teeth 102 having a trapezoid shape, when the pole teeth 102 are set to make thinner for reducing the size in the radial direction of the motor, magnetic saturation is easily occurred and a torque (rotational force) of the motor is not increased. Moreover, the experiments of the present inventor have cleared that, when the pole teeth 102 are formed in a trapezoid shape and made thinner as they are, magnetic saturation is occurred and the detent torque which is a stationary torque of the motor is liable to be larger.

In order to avoid the magnetic saturation, when the whole size of the pole teeth 102 in a trapezoid shape is increased, both of the root part 107 and the tip end part 108 of the pole tooth 102 are widened in the circumferential direction. As a result, the width of the root part 107 becomes wider than the width of one magnetic pole of the rotor and thus the root part 107 is extended over two magnetic poles. In this state, a torque down of the motor is occurred.

Further, in order to increase a torque of the motor (rotational force of the motor), when the pole teeth are formed in a rectangular shape instead of a trapezoid shape, the detent torque becomes larger to occur cogging as described above and smooth rotation is not attained.

SUMMARY OF THE INVENTION

In view of the problems described above, at least an embodiment of the present invention may advantageously provide a motor whose detent torque is not increased while a torque of the motor is increased.

According to at least an embodiment of the present invention, there may be provided a motor including a stator which is provided with a yoke having a plurality of pole teeth that is arranged in a circumferential direction and an exciting coil, and a rotor which is disposed in a circular space surrounded by the pole teeth. In this motor, a portion where a circumferential-width difference between an inner side area of the pole tooth (each of the pole teeth) facing the rotor and an outer side area of the pole tooth facing the exciting coil is larger than a circumferential-width difference between the inner side area and the outer side area of the pole tooth where both circumferential direction faces of the pole tooth are formed in faces coincided with normal lines with respect to a center line of the circular space surrounded by the pole teeth is provided on a root part of the pole tooth.

According to this structure, since magnetic flux is not concentrated and the inner area of the root part of the pole tooth is reduced, the detent torque is not increased. Moreover, since an outer area of the root part is increased, magnetic saturation is hard to occur and thus the detent torque is further not increased. In addition, since the magnetic saturation is hard to occur, the torque of the motor can be increased.

According to at least an embodiment of the present invention, there may be provided a motor including a stator which is provided with a yoke having a plurality of pole teeth that is arranged in a circumferential direction and an exciting coil, and a rotor which is disposed in a circular space surrounded by the pole teeth. In this motor, the pole tooth (each of the pole teeth) is formed so that a width of the pole tooth in the circumferential direction becomes narrower from a base toward a tip end of the pole tooth, and circumferential direction faces of at least a root part of the pole tooth are formed to face the rotor in an inclined manner. Specifically, the root part of the pole tooth is provided with a circumferential direction face which is formed so that a straight line formed by connecting a circumferential direction end of an outer peripheral face of the pole tooth with a circumferential direction end of an inner peripheral face of the pole tooth is directed more toward a center side in a circumferential direction of the pole tooth than the normal line. In this case, when one of the pole teeth is viewed in a state that the base of the pole tooth is located on a lower side and its tip end is located on an upper side, at an upper face position of a ring-shaped part which is extended from the base of the pole tooth toward an outer side in a radial direction, an angle θ1 which is formed by two circumferential direction faces at both ends in the circumferential direction of the pole tooth is set to be larger than an angle θ0 which is formed by two normal lines at both ends in the circumferential direction of the outer peripheral face of the pole tooth.

Also in this structure, since magnetic flux is not concentrated and the inner area of the root part of the pole tooth is reduced, the detent torque is not increased. Moreover, since the outer area of the root part is increased, magnetic saturation is hard to occur and thus the detent torque is further not increased. In addition, since the magnetic saturation is hard to occur, the torque of the motor can be increased.

In the embodiment of the present invention, it is preferable that, when the pole tooth is viewed from the exciting coil side in a state that the base of the pole tooth is located on a lower side and its tip end is located on an upper side, a shape of a left side face of the pole tooth is formed in an S-shape and a shape of a right side face of the pole tooth is formed in an inverse S-shape. According to this structure, a portion from the center part to the tip end part is widened and thus magnetic flux of a magnet of the rotor is effectively utilized and the root part can be widened largely and magnetic saturation is hard to occur.

Further, it is preferable that the S-shape and the inverse S-shape are formed so that a portion from the base to a vicinity of the height center is a straight line or a curve which is bulged toward an outer side so as to form a plural-portion curved shape, and so that a portion from the vicinity of the height center to a vicinity of the tip end is formed in a bulged shape toward an outer side by connecting two straight lines with each other or by a curve. According to this shape, the S-shape and the inverse S-shape are easily formed. Specifically, the straight line or the curve which is bulged toward the outer side so as to form the plural-portion curved shape from the base of the pole tooth to the vicinity of the height center is formed so that an inclined degree with respect to the ring-shaped part is set to be smaller in comparison with an inclined degree of a center part of the pole tooth, and the two straight lines or the curve from the vicinity of the height center to the vicinity of the tip end are comprised of a portion whose inclined degree is larger in comparison with an inclined degree of the root part side and a portion whose inclined degree is substantially the same as the inclined degree of the root part side.

In addition, it is preferable that a part or all of a center part of the pole tooth is provided with the circumferential direction face which is formed so as to coincide with the normal line or which is formed to be inclined more toward an exciting coil side than the normal line. In this case, it is preferable that when one of the pole teeth is viewed in a state that the base of the pole tooth is located on a lower side and its tip end is located on an upper side, at an upper face position of the ring-shaped part, an angle θ1 which is formed by two circumferential direction faces at both ends in the circumferential direction of the pole tooth is set to be larger than an angle θ0 which is formed by two normal lines at both ends in the circumferential direction of an outer peripheral face of the pole tooth, and a part or all of a center part of the pole tooth is provided with the circumferential direction face which is formed so as to coincide with the normal line or which is formed to be inclined more toward an exciting coil side than the normal line. According to the structure of the pole tooth as described above, the root part of the pole tooth can be easily widened.

Further, it is preferable that a width dimension of the root part which is a region reaching from the base to the center part of the pole tooth is wider than a magnetized width of a magnetic pole of a magnet of the rotor. Specifically, it is preferable that a width dimension of the root part at circumferential direction ends of the outer peripheral face of the pole tooth is set to be wider than the magnetized width of the magnetic pole of the magnet of the rotor, and a width dimension of the root part at circumferential direction ends of the inner peripheral face of the pole tooth is set to be narrower than the magnetized width of the magnetic pole of the magnet of the rotor. According to this structure, since the root part of the pole tooth is extended over two different magnetized areas, some torque down may occur in the stepping motor. However, the inner side width dimension of the pole tooth is smaller than the magnetized width of the magnetic pole of the magnet and thus the torque down does not become larger and, on the other hand, the magnetic saturation is restrained. As a result, a torque of the stepping motor is increased but its detent torque is not increased.

In accordance with an embodiment of the present invention, a thickness of the pole tooth is set to be thinner by 15-30% than a thickness of the ring-shaped part which is extended from the base of the pole tooth toward an outer side in a radial direction. As described above, when a thickness of the pole tooth is set to be thinner by 15% or more than a thickness of the ring-shaped part, the size in the radial direction of the motor can be reduced or a diameter of the rotor can be increased. Further, when a difference between their thicknesses is set by 30% or less, a yoke structuring the stator can be efficiently formed.

Further, in accordance with an embodiment of the present invention, a tip end side of the tip end part of the pole tooth is formed in a semicircular-shaped curve which is protruded in a tip end direction. According to this structure, magnetic flux concentration on the tip end side is prevented and thus the detent torque is not increased and the pole teeth are easily manufactured.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 is an explanatory view for showing which direction the pole tooth shown in FIGS. 5 and 6 are viewed from.

DETAILED DESCRIPTION OF THE PREFERRED EMBODIMENTS

A motor in accordance with an embodiment of the present invention will be described below with reference to the accompanying drawings. The motor in this embodiment is a stepping motor for driving an optical pickup which is used in an ODD (Optical Disc Drive).

Figure 1:
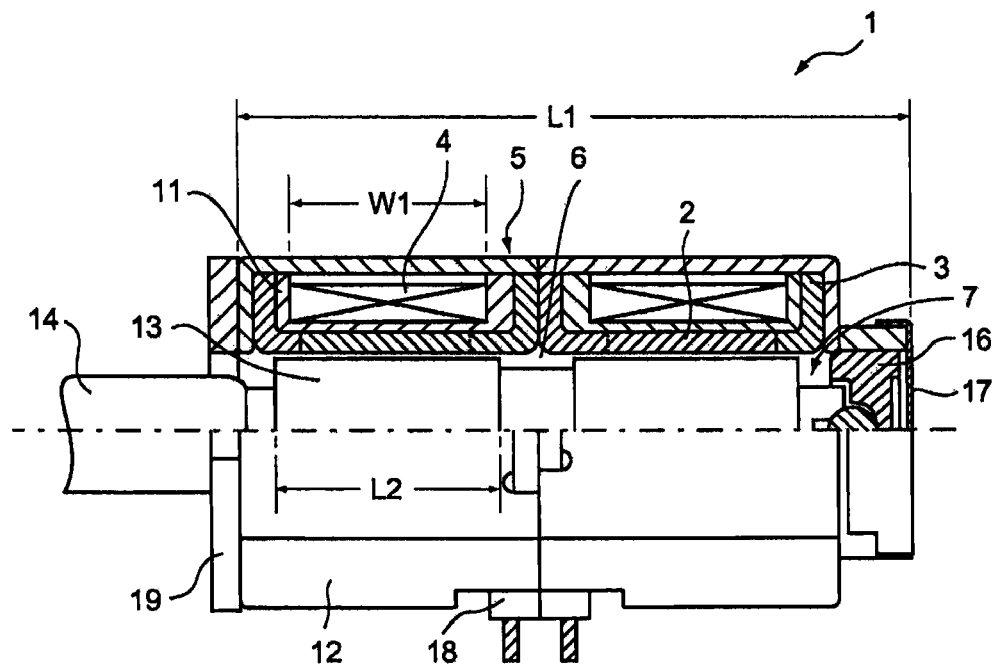
FIG. 1 is a half cross-sectional front view showing a stepping motor as an example of a motor in accordance with an embodiment of the present invention in which a part of an upper half portion is a cross-sectional view and a remaining part of the upper half portion is shown in a state where a case is removed.

As shown in FIG. 1, the stepping motor 1 includes a stator 5 provided with metal yokes 3 in which a plurality of pole teeth 2 is arranged in a circumferential direction and exciting coils 4, and a rotor 7 which is disposed in a circular space 6 surrounded by the pole teeth 2.

The stator 5 is provided with two pairs of yokes each of which is comprised of an inner yoke and an outer yoke. Specifically, the stator 5 includes two pairs and total four yokes 3, total two exciting coils 4 which are disposed for respective pairs of the yokes 3, and total two coil bobbins 11 which are disposed between the exciting coil 4 and the yoke 3. Further, the stator 5 is provided with metal cases 12 for covering the rotor 7 and the yokes 3 and for forming magnetic paths. The rotor 7 is provided with magnets 13 on which magnetic poles different from each other are alternately magnetized in a circumferential direction, and a rotor shaft 14 to which the magnets 13 are fixed. The stepping motor 1 further includes a bearing 16 for supporting the rotor shaft 14, an urging member 17 for urging the rotor shaft 14 in an axial direction, a connection part 18 for electric connection, a mounting plate 19 and the like. However, since these structural members are not directly related to the embodiment of the present invention, their detailed descriptions are omitted.

A length "L1" of the stepping motor 1 which is comprised of the stator 5, the bearing 16 and the urging member 17 is set to be 12.6 mm, a width "W1" of the respective exciting coils 4 is set to be 3.7 mm, and an axial direction length "L2" of the respective magnets 13 is set to be 3.85 mm. The respective magnets 13 are disposed to have a symmetrical positional relationship to one pair of the yokes 3. In other words, the center in the axial direction of one magnet 13 and the center in the axial direction of one pair of the yokes 3 corresponding to the magnet 13 are set to be the same position in the axial direction.

Figure 2:
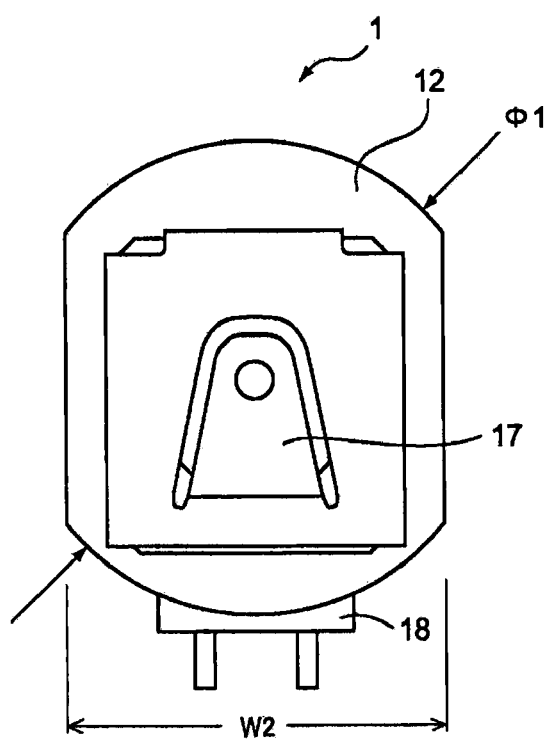
FIG. 2 is a right side view showing the stepping motor in FIG. 1.

A side face shape of the stepping motor 1 is, as shown in FIG. 2, formed in a cutoff-like shape such that two parts facing each other are cut off from a circular shape. Therefore, the size of the motor 1 is reduced by the amount of the cutoff-like portions and the cutoff-like portions may be spatially handled as margin portions. In FIG. 2, a lateral width "W2" of the stepping motor 1 is 6 mm and an outer diameter "Φ1" is 7.5 mm. In this embodiment, the cutoff-like portion is not actually cut off but is formed by means of that the side face of the case 12 is bent. Therefore, the case 12 is provided with a metal portion over the entire periphery to cover the exciting coils 4.

Figure 3:
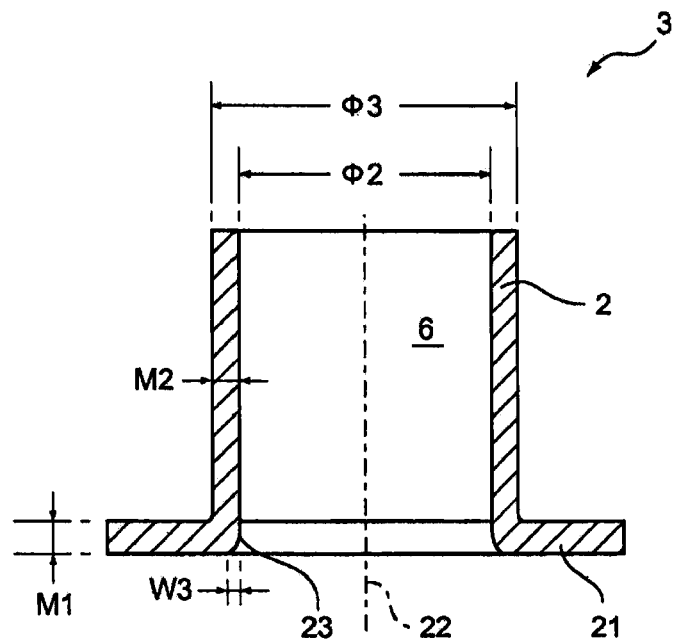
FIG. 3 is a cross-sectional view showing a yoke which is used in the stepping motor shown in FIG. 1 and which is cut along the "A-A" line in FIG. 4.
Figure 4:
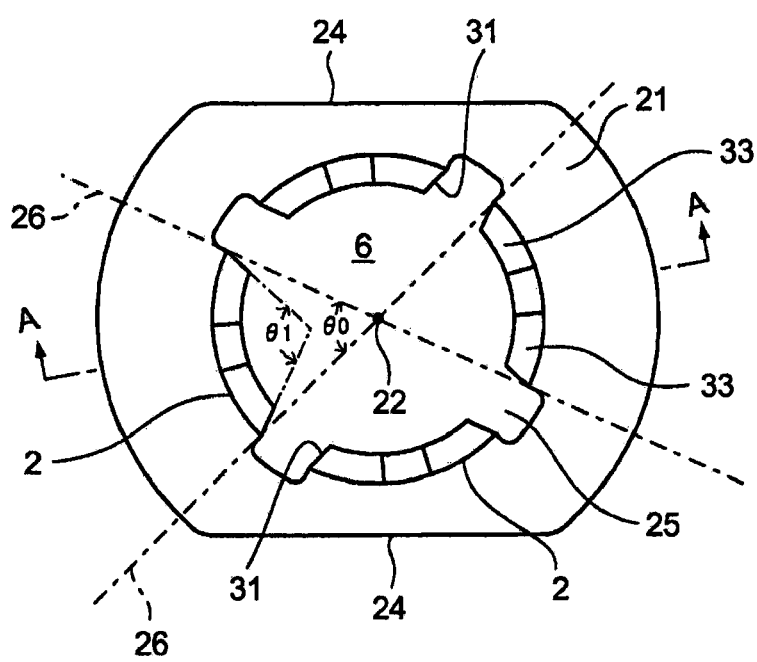
FIG. 4 is a plan view showing the yoke in FIG. 3.

The yoke 3 is shown in FIGS. 3 and 4. The yoke 3 is an outer yoke of the yokes 3 shown in FIG. 1 which is disposed on an outer side. An inner yoke is different from the outer yoke only in the external shape of a ring-shaped part 21 which will be described below and other shape of the inner yoke is the same as the outer yoke. Therefore, portions common to all the yokes 3 will be described below by using "respective yokes". In the respective yokes 3, as shown in FIGS. 3 and 4, four pole teeth 2 are perpendicularly stood up from the ring-shaped part 21. FIG. 3 is a cross-sectional view which is cut by the "A-A" line in FIG. 4. A thickness "M1" of the ring-shaped part 21 is set to be 0.45 mm and a thickness "M2" of the pole tooth 2 is set to be 0.37 mm. As described above, since the thickness of the pole tooth 2 is set to be thinner by 15% or more than the thickness of the ring-shaped part 21, the diameter of the magnet 13 may be increased. In a case that the diameter of the magnet 13 is not increased, a winding amount of the exciting coil 4 can be increased. In any case, even when the entire diameter of the motor 1 is set to be smaller, the same degree of torque can be obtained. Further, in a case that a decreasing ratio of the thickness "M2" with respect to the thickness "M1" is set to be 30% or less, a time period required to make the pole teeth 2 thinner is not prolonged and, in addition, the boundary portion between the pole tooth 2 and the ring-shaped part 21 is hard to be magnetically saturated.

A circular space 6 which is surrounded by the pole teeth 2 of the respective yokes 3 is a cylindrical shaped space whose center line 22 is the center. The inner diameter "Φ2" of the circular space 6 is 3.46 mm and the outer diameter "Φ3" of the cylindrical shape formed by the pole teeth 2 is 4.2 mm. Further, in order to enhance the linearity, the curvature of a rising part 23 of each of the pole teeth 2 is set to be smaller. In this embodiment, the dimension "W3" in the radial direction of the rising part 23 which is formed in a curved shape is set to be 0.2 mm or less. The dimension of 0.2 mm is a ratio of about 5.8% with respect to the inner diameter "Φ2". When taking enhancement of the linearity and easy manufacturing into consideration, it is preferable that the ratio indicating the perpendicularity of the pole teeth 2 is 3-7%, and it is further more preferable that the ratio is 4-6%.

The outer yoke is, as shown in FIG. 4, formed in a shape such that the ring-shaped part 21 are partially cut out. The cut-out parts 24 are formed in a 180 degree point-symmetrical manner with respect to the center line 22. Further, the respective yokes 3 are formed with notched parts 25 between the respective pole teeth 2 in order to easily form the pole teeth 2. In this embodiment, side faces of the base 31 of each of the pole teeth 2 are not formed so as to coincide with the normal lines 26 with respect to the center line 22. This will be described in detail below. FIG. 4 shows only two normal lines 26. However, the normal line 26 is a normal line with respect to a curved surface which is formed by an outer peripheral face of the pole tooth 2, and the normal line 26 is a straight line which passes the center line 22 and perpendicularly intersects the center line 22 and thus many normal lines 26 are existed.

Figure 5:
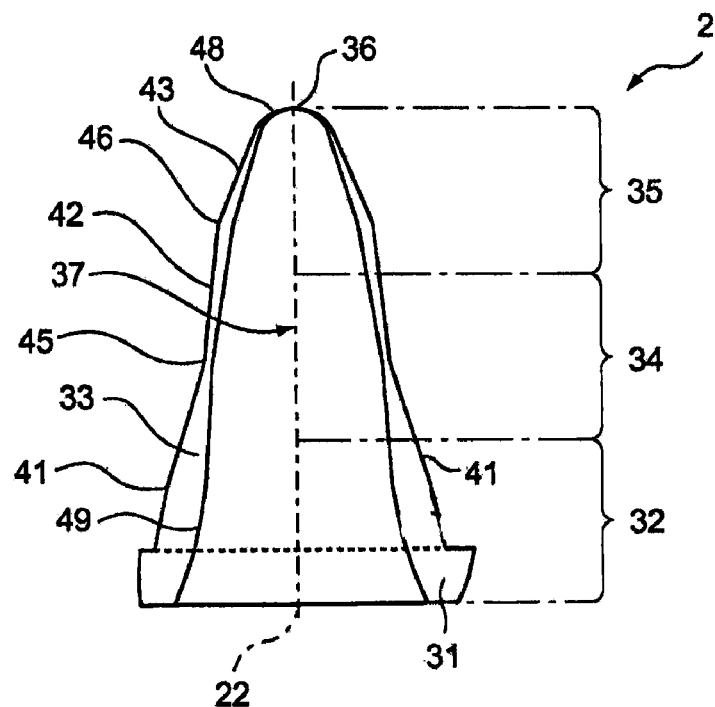
FIG. 5 is a view showing one of the pole teeth (pole tooth) of the yoke which is used in the stepping motor in FIG. 1 and which is viewed from a rotor side.
Figure 13:
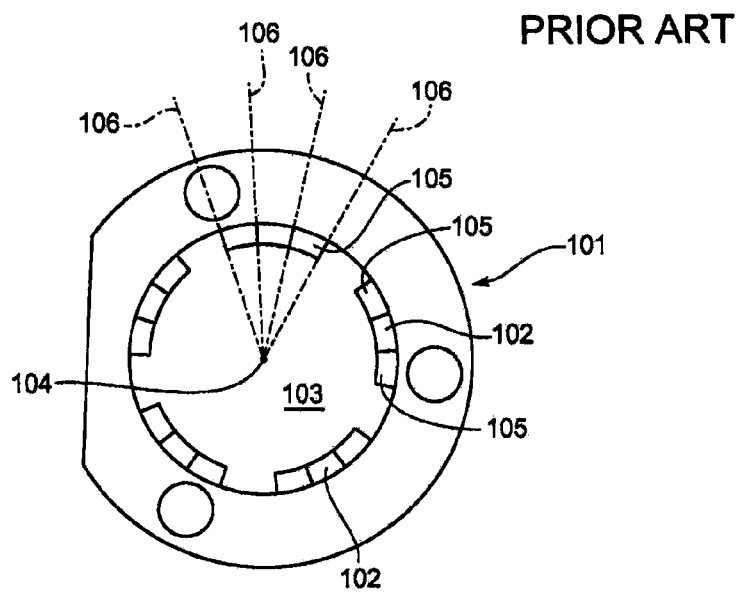
FIG. 13 is a plan view showing the starter yoke in FIG. 12.

As shown in FIG. 4, side faces of the base 31 of the pole tooth 2 is not along the normal line 26, i.e., not formed to be coincided with the normal line 26. Specifically, in the root part 32 including the base 31, as shown in FIGS. 4 and 5, circumferential direction faces 33 which are side faces of the root part 32 are formed so as to face the rotor 7 in an inclined state with respect to the normal line 26. In other words, the circumferential direction faces 33 of the root part 32 are formed to face the rotor 7 in an inclined manner. More specifically, in the root part 32 of one of the pole teeth 2, a straight line which connects a circumferential direction end of its outer peripheral face with a circumferential direction end of its inner peripheral face is directed more toward a center side in the circumferential direction of the pole tooth than the normal line. Therefore, in the root part 32 of each of the pole teeth 2, an angle θ1 which is formed by the circumferential direction faces 33 at both ends in the circumferential direction, for example, at an upper face position of the ring-shaped part 21, is set to be larger than an angle θ0 which is formed by the normal lines 26 at both ends in the circumferential direction of the outer peripheral face of the root part 32 (θ1>θ0). As a result, the circumferential direction faces 33 of the root part 32 face the outer peripheral face of the rotor 7 in an inclined state instead of facing in a perpendicular state. Conventionally, as shown in FIG. 13, the circumferential direction faces 105 of the pole tooth 102 are extended in a direction of the center line 104 of the rotor 7, in other words, formed to be coincided with the normal line 106, and thus the circumferential direction faces 105 of the pole tooth 2 is not faced to the outer peripheral face of the rotor 7 in an inclined state and the circumferential direction faces 105 are not formed to face the rotor 7. On the other hand, in the stepping motor 1 in this embodiment, the circumferential direction faces 33 of the root part 32 are formed so that the straight lines which connect the circumferential direction ends of the outer peripheral face with the circumferential direction ends of the inner peripheral face are formed to extend toward the center sides in the circumferential direction of the pole tooth with respect to the normal lines 26 (θ1>θ0). In this manner, the circumferential direction faces 33 of the root part 32 are formed to face the rotor 7. This means that a circumferential-width difference between an inner side area facing the rotor 7 of the pole tooth 2 and its outer side area facing the exciting coil 4 is larger than its circumferential-width difference when the circumferential direction faces 105 of the pole tooth 102 are formed so as to be coincided with the normal lines 106 with respect to the center line 104 like a conventional example. In this embodiment, when the pole tooth 2 is viewed in the height direction, the circumferential direction face 33 is formed in the root part 32 of the pole tooth 2 so as to be inclined more toward the center side in the circumferential direction of the pole tooth than the normal line (θ1>θ0). However, at least a part of the circumferential direction face 33 over the center part 34 of the pole tooth 2 is formed so as to coincide with the normal line 26 (θ1=θ0), and at least a part of the circumferential direction face 33 over its tip end side from the center part 34 is formed to be inclined more toward the exciting coil 4 side than the normal line 26 (θ0>θ1).

Figure 6:
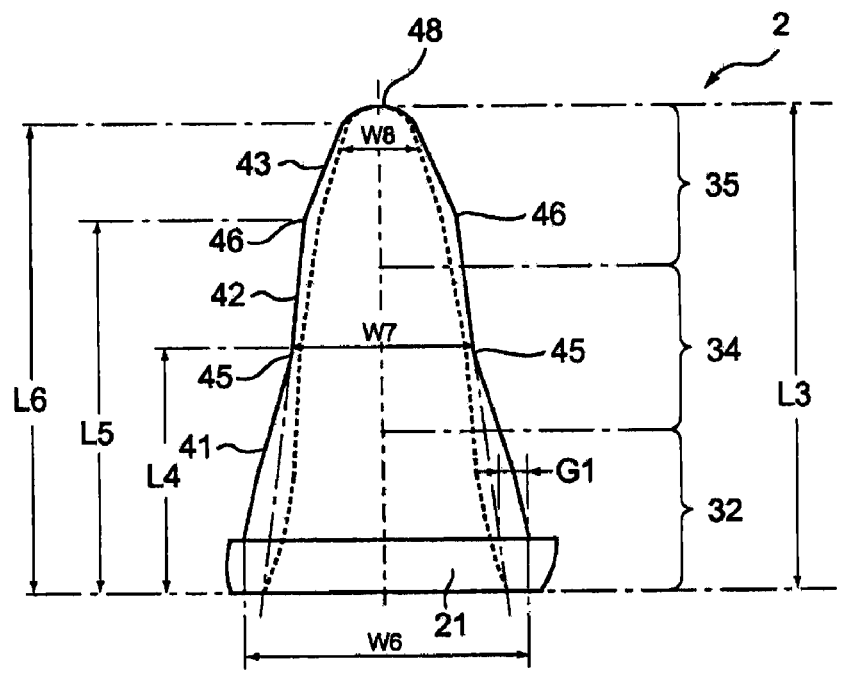
FIG. 6 is a view showing one of the pole teeth (pole tooth) of the yoke which is used in the stepping motor in FIG. 1 and which is viewed from an exciting coil side.
Figure 7:
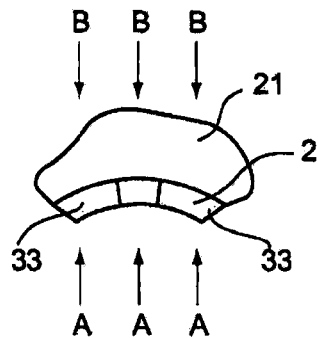

The base 31, the root part 32 and the like of the pole tooth 2 will be described below with reference to FIGS. 5, 6 and 7. FIG. 5 is a view showing the pole tooth 2 which is viewed from the rotor 7 side, i.e., in a direction of the arrow "A" in FIG. 7. FIG. 6 is a view showing the pole tooth 2 which is viewed from the exciting coil 4 side, i.e., in a direction of the arrow "B" in FIG. 7. The base 31 is a portion of the pole tooth 2 which corresponds to the ring-shaped part 21 and the root part 32 is a portion which is the nearest to the ring-shaped part 21 of three-equally divided sections of the length "L3" of the pole tooth 2. The center part 34 of the pole tooth 2 is a portion corresponding to the center of the three-equally divided sections and the tip end part 35 is a region which is the farthest portion from the ring-shaped part 21. The tip end 36 is the remotest portion from the ring-shaped part 21 of the pole tooth 2. Further, the height center 37 is a center point in the height direction of the pole tooth 2.

As shown in FIGS. 5 and 6, each of the pole teeth 2 is formed in a shape in which its width in the circumferential direction becomes narrower toward the tip end 36 from the base 31.

Further, as shown in FIG. 6, when the pole tooth 2 is viewed from the exciting coil 4 side in a state that its base 31 is located on a lower side and its tip end 36 is located on an upper side, a shape on its left side face is an S-shape and a shape of its right side face is an inverse S-shape. In this embodiment, the shape of the side face of the pole tooth 2 is formed as follows. A portion from the upper end of the base 31 in FIG. 6, i.e., from the upper face position of the ring-shaped part 21 to the vicinity of the height center 37 is formed in a curve 41 which is bulged toward an outer side with a plural-portion curved shape and whose inclined degree from the upper face position of the ring-shaped part 21 is set to be smaller in comparison with an inclined degree of its tip end side. In addition, an upper portion connected with the curve 41 is formed in a shape which is bulged toward an outer side and which is comprised of a straight line 42 and a straight line 43. The straight line 42 is extended from the vicinity of the height center 37 and its inclined degree is larger than the inclined degree of the root part side. In other words, the inclination angle of the straight line 42 with respect to the ring-shaped part 21 is larger than the inclination angle of the root part side. The straight line 43 is extended from the straight line 42 and its inclined degree is substantially the same as that of the curve 41. The inclination angle of the straight line 42 with respect to the ring-shaped part 21 is set to be larger than the inclined degrees of the curve 41 and the straight line 43 and thus the upper portion connected with the curve 41 is formed to be bulged toward the outer side. In this embodiment, the curve 41 and the straight lines 42 and 43 are a designed shape and thus, after having been manufactured, the curve 41 may be formed to be a straight line and one or both of the straight lines 42 and 43 may be formed to be a curve. Further, in a designing stage, the curve 41 may be modified in a straight line and one or both of the straight lines 42 and 43 may be modified in a curve.

The height "L3" of the pole tooth 2 is set to be 4.1 mm when measured from the lower end of the ring-shaped part 21. Further, the height "L4" from the lower end of the ring-shaped part 21 to the upper end 45 of the curve 41 is set to be 2.0 mm and the upper end 45 of the curve 41 is located at a position slightly lower than the height center 37. The height "L5" of the connecting point 46 of the straight lines 42 and 43 from the lower end of the ring-shaped part 21 is set to be 3.15 mm. Further, the height "L6" of the point where the straight line 43 is connected with a semicircular-shaped curve 48 protruded toward the tip end direction is set to be 3.95 mm.

Figure 12:
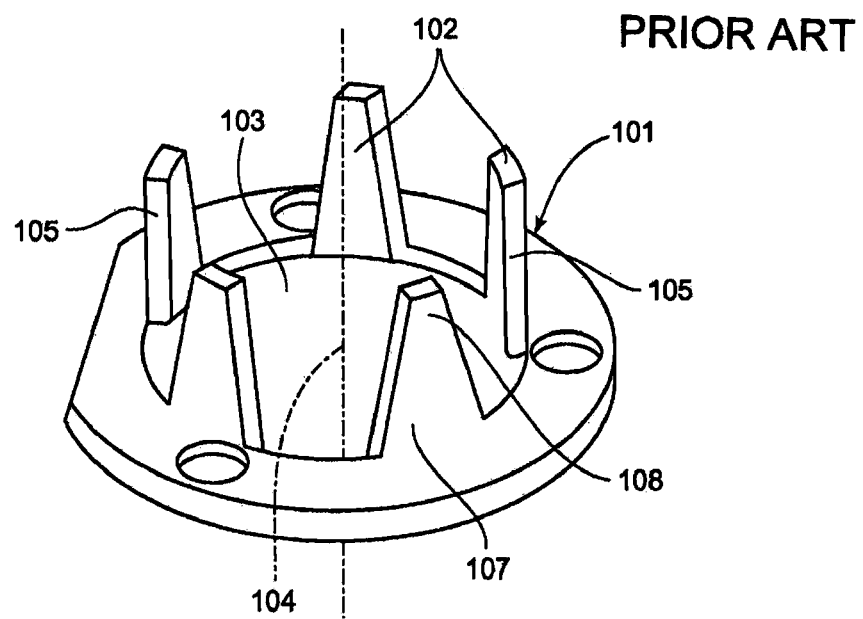
FIG. 12 is a perspective view showing a stator yoke of a conventional stepping motor.
Figure 14:
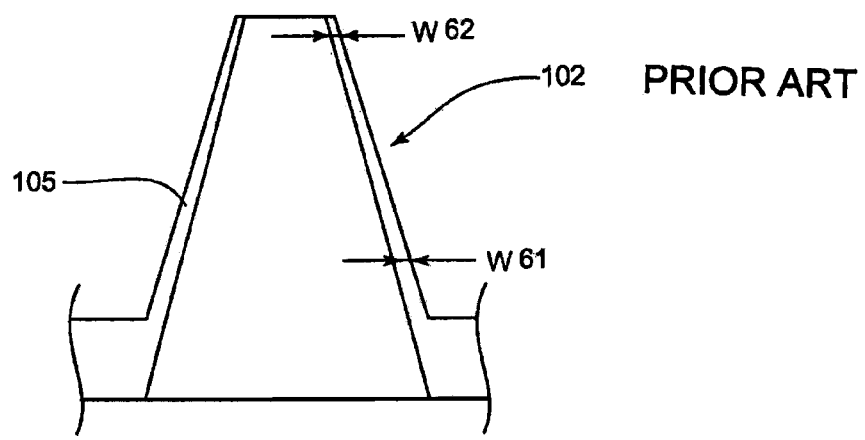
FIG. 14 is a view showing one of the pole teeth (pole tooth) of the stator yoke in FIG. 12 which is viewed from the rotor side and in which the number of the pole teeth of the stator yoke is four.

The pole tooth 2 in this embodiment will be described below while comparing with the conventional pole tooth 102 shown in FIG. 14. As shown in FIG. 12, the conventional pole teeth 102 are formed with five teeth in the stator yoke 101. However, in order to easily compare with the stepping motor 1 in this embodiment, one of the pole teeth 102 is shown in FIG. 14 when the pole teeth 102 are formed with four teeth. The pole tooth 102 shown in FIG. 14 is formed so that both of the circumferential direction faces 105 are coincided with the normal lines 106 with respect to the center line 103 which passes the center of the circular space 103. In a case of the pole tooth 102 described above, the external shape of the rotor side face of the pole tooth 102 is a trapezoid and the external shape of its exciting coil side is also a trapezoid. Further, the circumferential direction width "W62" (dimensional difference in the circumferential direction between a circumferential direction end of the outer peripheral face and a circumferential direction end of the inner peripheral face of the circumferential direction face 105) on the tip end part 108 side of the circumferential direction face 105 of the pole tooth 102 is set to be smaller than the circumferential direction width "W61" on the root part 107 side of the circumferential direction face 105 of the pole tooth 102. Further, the circumferential direction width "W61" becomes proportionally narrower toward the tip end side and the width on the tip end part 108 side is the circumferential direction width "W62".

In comparison with the example shown in FIG. 14, in a case of the pole tooth 2 in the stepping motor 1 in this embodiment which is shown in FIGS. 5 and 6, the circumferential direction width of the circumferential direction face 33 is not set to be narrower proportionally toward the tip end 36 side from the base 31. The circumferential direction face 33 in the root part 32 faces the outer peripheral face of the rotor 7 by being formed as an inclined face instead of formed as a perpendicular face to the outer peripheral face of the rotor 7. Therefore, the circumferential direction width of the circumferential direction face 33 on the ring-shaped part 21 side (a circumferential-width difference in the circumferential direction between a circumferential direction end of the outer peripheral side and a circumferential direction end of the inner peripheral side of the circumferential direction face 33) is wider than that of the above-mentioned conventional example. In other words, an area of the circumferential direction face 33 of the root part 32 which faces the rotor 7 (see FIG. 5) is set to be larger than that of the above-mentioned conventional example. Further, the circumferential direction width at the position of the upper end 45 of the curve 41 is set to be equal to or a little smaller than that of the above-mentioned conventional example shown in FIG. 14. In a state that the circumferential direction width is set to be smaller than that of the above-mentioned conventional example, the circumferential direction face 33 is inclined more toward the exciting coil 4 side than the normal line 26. In other words, the circumferential direction face 33 is inclined more toward the opposite side to the center side in the circumferential direction of the pole tooth 2 than the normal line 26. Further, at a position of the connecting point 46, the circumferential direction width of the circumferential direction face 33 is widened again in comparison with the position of the upper end 45 and an area facing the rotor 7 is larger than that of the conventional example shown in FIG. 14.

In the case of the pole tooth 2 in the stepping motor 1 in this embodiment which is shown in FIGS. 5 and 6, the circumferential direction width of the outer shape of the root part 32 is set to be considerably wider in comparison with that of an outer shape when the straight line 42 is extended as it is instead of the curve 41. A circumferential-width difference "G1" of the circumferential direction widths at the upper end of the base 31 (i.e., a circumferential width-difference between the inner circumferential side facing the rotor and the outer circumferential side facing the stator coil) is 1.2 times or more and 2.5 times or less than the circumferential direction width "W61" in the conventional case where the straight line 42 is extended. When easy manufacturing, magnetic saturation and the like are taken into consideration, it is preferable that the value "G1" is 1.4 times or more and 2.0 times or less than the width "W61". As described above, in this pole tooth 2, the circumferential direction width of the root part 32, especially, the circumferential direction width "W6" at the upper end of the base 31, is extremely widened in comparison with the circumferential direction width "W7" at the height center 37 and the circumferential direction width "W8" at the substantially center of the tip end part 35. The yoke 3 having the above-mentioned pole teeth 2 may be manufactured by a method substantially the same as the method described in FIGS. 1 through 3 in Japanese Patent Laid-Open No. 2000-350431 but other manufacturing methods may be adopted.

Figure 8:
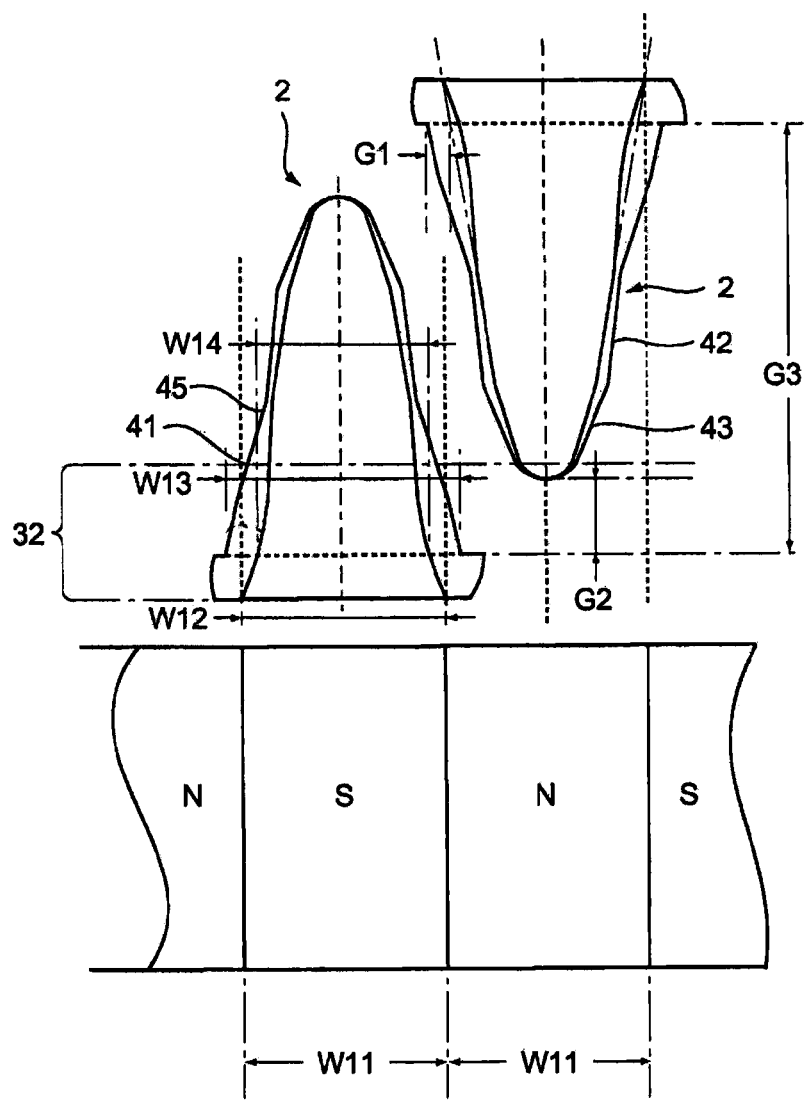
FIG. 8 is an explanatory view showing a positional relationship between the pole teeth and a magnet of the stepping motor shown in FIG. 1.

Positional relationship between the pole teeth 2 and the magnet 13 of the rotor 7 is shown in FIG. 8. As shown in FIG. 8, a magnetized width "W11" of the respective poles of the magnet 13 and the circumferential direction width "W12", which is a width dimension at the lower end of the base 31 in the inner face of the pole tooth 2, is substantially the same as each other. Therefore, the circumferential direction ends of the inner face at the upper face position of the ring-shaped part 21 are located within the magnetized width "W11" of the magnet 13. On the other hand, the circumferential direction width "W13" which is a width dimension of the outer face of the pole tooth 2 at the upper face position of the ring-shaped part 21 is larger than the circumferential direction width "W12". Further, in comparison with the circumferential direction width "W14", which is a width dimension of the inner face of the pole tooth 2 at the upper face position of the ring-shaped part 21, the circumferential direction width "W13" is set to be considerably wider and thus the circumferential direction ends of the outer face of the pole tooth 2 at the upper face position of the ring-shaped part 21 are located on the outer sides with respect to the magnetized width "W11" of the magnet 13. In other words, the relationship of the width dimensions is set to be "W14"<"W12"<"W13". Further, in the pole tooth 2, a region which is wider than the magnetized width "W11" is from the lower end of the base 31 in FIG. 8 to a slightly lower position than the middle position of the curve 41. In other words, both ends in a widthwise direction of the circumferential direction faces 33 of the root part 32 forms a region which is wider than the magnetized width "W11".

As shown in FIG. 8, the circumferential direction width "W12" at the lower end of the base 31 in the inner face of the pole tooth 2 is substantially same as the magnetized width "W11". In other words, since the width of the inner face of the pole tooth 2 at the lower end of the base 31 is substantially the same as magnetized width "W11", effects of adjacent pole teeth 2 to the facing pole of the magnet 13 become minimum and adverse effects to a torque are restrained.

Adjacent two pole teeth 2 are disposed so as to have substantially the same distance as shown in FIG. 8. Especially, the portions of the straight lines 42 are adjacent to each other with the straight lines 42 and their inclinations are the same and thus the distance between the straight lines 42 is uniform. The portions where the curve 41 and the straight line 43 are adjacent to each other are also provided with substantially the same distance because the curve 41 is formed in an almost straight line. In other words, the curve 41 and the straight line 43 are respectively inclined by a substantially equal angle in reverse directions to each other with respect to the straight line 42 which is formed between the curve 41 and the straight line 43. Further, the curve 41 is inclined with respect to the straight line 42 at an inclination angle so as to get closer to the adjacent pole tooth, and the straight line 43 is inclined with respect to the straight line 42 in a reverse side to the curve 41 at an inclination angle so as to be separated from the adjacent pole tooth. When the curve 41 is regarded as a straight line and its inclination angle with respect to the upper face of the ring-shaped part 21 is regarded as the same as that of the straight line 43, all distances of two adjacent pole teeth 2 are equal to each other. In this embodiment, since the outer area of the root part 32 of the pole tooth 2 is larger than that of the conventional pole tooth 102 shown in FIG. 14, the distance between adjacent pole teeth 2 is narrower than that of the conventional case.

The space "G2" between the tip end 36 of the pole tooth 2 and the ring-shaped part 21 is set in a ratio of 15.8% of the space "G3" between the ring-shaped part 21 of one of a pair of yokes 3 and the ring-shaped part 21 of the other yoke 3. However, when easy manufacturing and an increase in torque of the stepping motor 1 are taken into consideration, it is preferable that the ratio is 14-18%.

Figure 9:
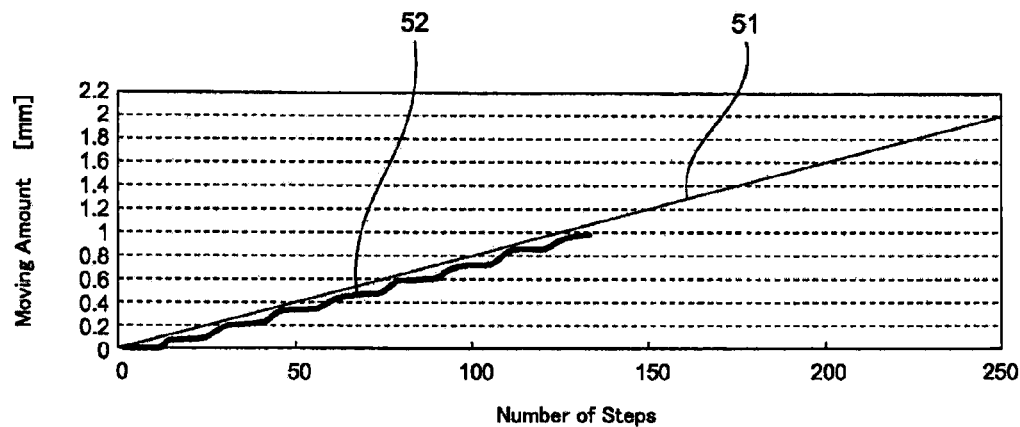
FIG. 9 is an explanatory view showing a condition of linearity when a pickup is driven by the stepping motor shown in FIG. 1.

FIG. 9 shows a linearity of the stepping motor 1. In the stepping motor 1, the number of the pole teeth 2 comprised of a pair of the yokes 3 is eight, and positions of the respective pole teeth 2 of the pair of the yokes 3 are shifted from each other and thus the rotor 7 is surrounded by 16 pieces of the pole teeth 2. Therefore, a mechanical step angle is "360 degree divided by 16", which is 22.5 degree. The number of magnetic poles of the respective magnets 13 is 8 and magnetized relationship of the two magnets 13 are substantially the same as each other in the axial direction. In the stepping motor 1, the rotor 7 is operated with 256 steps for one rotation by a micro-step driving.

In FIG. 9, the horizontal scale indicates the number of steps and the vertical scale indicates a moving amount (unit: mm) of a pickup which is driven by the stepping motor 1. The straight line is an ideal line 51 and the line going along the ideal line 51 in a zigzag state is an actual line 52 which shows its real state when the stepping motor 1 is driven. The actual line 52 is extended along the ideal line 51, the maximum value of one (1) step feeding is 41 µm and a stable feeding is attained. In other words, a detent torque of the stepping motor 1 is not increased and, although the size of the stepping motor 1 is reduced, a torque of the motor is sufficiently secured. This may be understood with reference to FIG. 10, which is a view showing the linearity of a conventional large stepping motor.

Figure 10:
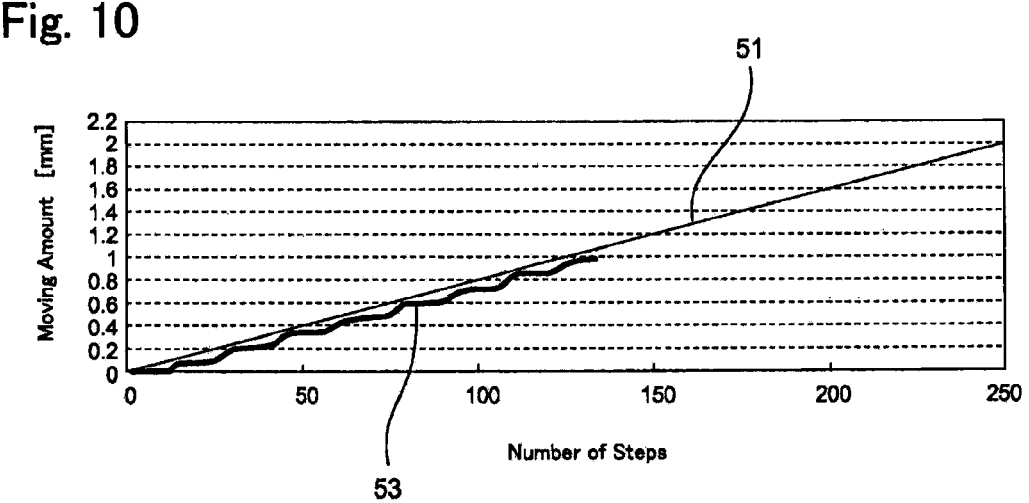
FIG. 10 is an explanatory view showing a condition of linearity when a pickup is driven by a conventional stepping motor having been manufactured by the present applicant.

FIG. 10 is an explanatory view showing a state of the linearity when a pickup is driven by a conventional stepping motor in which "L1" is 14.6 mm, "L2" is 4.81 mm, "W1" is 4.3 mm and "W2" is 6 mm. The stepping motor is a conventional stepping motor which has been manufactured and marketed by the present applicant. In this embodiment, respective values of the stepping motor 1 are set to be as follows; "L1" is 12.6 mm, "L2" is 3.85 mm, "W1" is 3.7 mm and "W2" is 6 mm. Further, regarding other values, when the stator yoke shown in FIG. 12 and the stepping motor 1 are compared with each other, the values are as follows. Values of the stepping motor 1 are indicated within parentheses. "Φ1" is 7.5 mm (7.5 mm), "Φ2" is 3.5 mm (3.46 mm), "Φ3" is 4.4 mm (4.2 mm), "M1" is 0.5 mm (0.45 mm), "M2" is 0.45 mm (0.37 mm), and the outer diameter of the magnet is 3.2 mm (3.16 mm). As described above, in the conventional stepping motor, its length "L1" is set to be larger and the width "W1" of the exciting coil is also set to be larger and thus the degree of margin is secured. Therefore, as shown in FIG. 10, the actual line 53 is extended along the ideal line 51 and, in addition, the maximum value of one (1) step feeding is 43 µm and a stable feeding is attained.

As understood by comparison of FIG. 9 with FIG. 10, although the size of the stepping motor 1 is reduced in its length direction, substantially the same linearity as the conventional motor is attained. This means that, although the size of the stepping motor 1 is reduced, magnetic saturation is not occurred and its detent torque is not increased. Further, this means that, although the size of the stepping motor 1 is reduced, a torque of the motor is sufficiently secured. In this embodiment, since the outer side area of the root part 32 of the pole tooth 2 is increased, distances between adjacent pole teeth 2 (distance on the exciting coil 4 side of adjacent pole teeth 2) become narrower in all the length direction. When a distance between adjacent pole teeth 2 of the stepping motor 1 is set to be "d1" and a distance between adjacent pole teeth of the motor in FIG. 10 is set to be "d2", the relationship of "d1×1.5=d2" is satisfied. In a case that the relationship between "d1" and "d2" is set to be "d2×0.5≦d1≦d2×0.8", it is preferable that a torque down of the motor due to over-widening of the pole tooth 2 is restrained and magnetic saturation is restrained by setting the root part 32 wider. In this embodiment, since the inner side area of the root part 32 is set to be considerably smaller, a torque down of the motor due to over-widening of the pole tooth 2 is considerably restrained.

In the stepping motor 1, since the outer side area of the root part 32 of the pole tooth 2 is set to be larger, the magnetic flux is not concentrated and, on the other hand, since the inner side area of the root part 32 of the pole tooth 2 is set to be smaller, the detent torque is not increased. In addition, since the outer side area of the root part 32 is set to be larger, magnetic saturation is hard to be occurred and thus the detent torque is not increased. Further, since the magnetic saturation is hard to be occurred, a torque of the motor can be increased. Further, since a detent torque is not increased, cogging is not also increased. In addition, since contacting area of the exciting coil 4 with the pole teeth 2 is increased while suppressing increase of a picking-up amount of magnetic flux from the magnet 13, heat radiation of the exciting coil 4 is preferably performed. Further, since the outer side area of the root part 32 of the pole tooth 2 is increased, a space between adjacent pole teeth 2 becomes narrower and thus intrusion of dust to the magnet 13 side is reduced.

Further, in a case that the pole tooth 2 is viewed from the exciting coil 4 side in a state that its base 31 is located on a lower side and its tip end 36 is on an upper side, a shape of the left side face is formed in an S-shape and a shape of the right side face is formed in an inverse S-shape. In other words, the inclined degree of the center portion of the side face with respect to the ring-shaped part 21 is set to be larger than the inclined degrees of the base side and the tip end side. Therefore, the portion extending from the center part 34 to the tip end part 35 is widened and magnetic flux from the magnet 13 of the rotor 7 is efficiently utilized. Further, the root part 32 can be widened larger and magnetic saturation is hard to be occurred. Further, the pole tooth 2 are formed so that the side face from the base 31 to the vicinity of the height center 37 is a straight line or a curve 41 which is bulged toward an outer side in a plural-portion curved shape, and so that the side face from the vicinity of the height center 37 to the vicinity of the tip end 36 is formed in a bulged shape toward an outer side by using two straight lines 42 and 43, which are connected with each other, or a curve. Therefore, the S-shape and the inverse S-shape are easily formed.

In addition, a part or all of the center part 34 of the pole tooth 2 is provided with the circumferential direction face 33 which is formed to be a face coincided with the normal line 26. Further, a part of the center part 34 of the pole tooth 2, or all or a part of the tip end part 35 is provided with the circumferential direction face 33 which is formed so as to face the exciting coil 4 instead of coinciding with the normal line 26. Therefore, the root part 32 of the pole tooth 2 can be easily widened. Further, in the root part 32 which is a region from the base 31 to the center part 34 of the pole tooth 2, a width dimension between the circumferential direction ends of the outer face of the pole tooth 2 at the upper face position of the ring-shaped part 21 is set to be wider than the magnetized width "W11" of one magnetic pole of the magnet 13 of the rotor 7. Therefore, since the root part 32 of the pole tooth 2 is extended over two different magnetized areas, some torque down may occur in the stepping motor 1. However, the width dimension between the circumferential direction ends of the inner side face of the pole tooth 2 at the upper face position of the ring-shaped part 21 is set to be smaller than the magnetized width "W11" and thus the torque down does not become larger and, on the other hand, magnetic saturation is restrained. Therefore, a torque of the stepping motor 1 is increased but its detent torque is not increased.

Further, the thickness "M2" of each of the pole teeth 2 is set to be thinner by 15-30% than the thickness "M1" of the ring-shaped part 21 which is extended from the base 31 of the pole teeth 2 toward the outer side in the radial direction. As described above, since the thickness "M2" of the pole tooth 2 is set to be thinner by 15% or more than the thickness "M1" of the ring-shaped part 21, the size in the radial direction of the stepping motor 1 can be reduced or a diameter of the rotor 7 can be increased. Further, since a difference between the thicknesses is set to be 30% or less, the yoke 3 structuring the stator 5 can be efficiently formed. In addition, the tip end 36 side of the tip end part 35 of the pole tooth 2 is formed in a semicircular-shaped curve 48 which is protruded in the tip end 36 side direction. Therefore, magnetic flux concentration on the tip end 36 side is prevented and the pole tooth 2 is easily manufactured.

Figure 11:
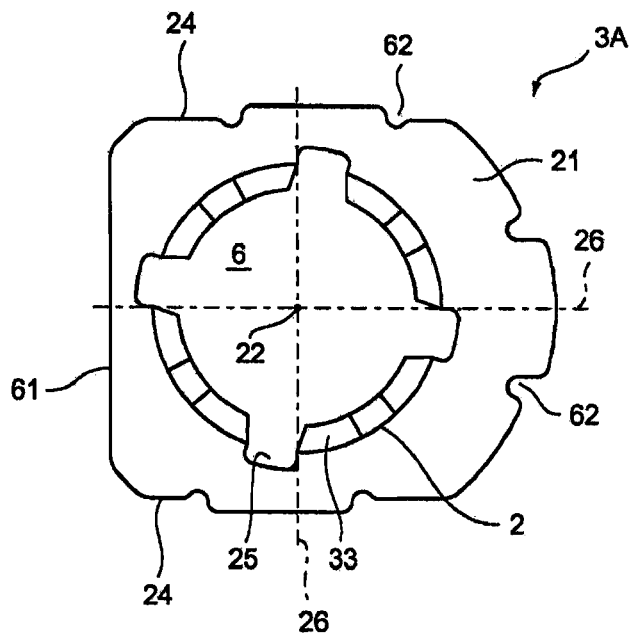
FIG. 11 is a view showing a modified example of the yoke which is used in the stepping motor shown in FIG. 1.

Although the present invention has been shown and described with reference to a specific embodiment, various changes and modifications will be apparent to those skilled in the art from the teachings herein. For example, the yoke may be formed in a shape like a yoke 3A shown in FIG. 11. The yoke 3A is used as an inner yoke of the stepping motor 1, and the shape and the like of the pole teeth 2 are the same as the yoke 3 which is the outer yoke and only the external shape of the ring-shaped part 21 is different from the yoke 3. In other words, the yoke 3A is formed with a cut-out part 61 in addition to the two cut-out parts 24 and totaled six positioning recessed parts 62 are formed on its outer peripheral face. The yoke 3A may be used as an outer yoke. Further, in a case that the connection part 18 is permitted to protrude largely toward the outer side of the motor, or the like, the yoke 3 shown in FIGS. 3 and 4 may be used as the outer yoke and the inner yoke. Further, in the description of the stepping motor 1, various numeric values are indicated but these numerical values are shown only as examples and other values may be adopted.

Further, in the stepping motor 1, the entire root part 32 of the pole tooth 2 is a portion where a difference between the inner side area of the pole tooth 2 facing the rotor 7 and the outer side area of the pole tooth 2 facing the exciting coil 4 is larger than a difference between the inner side area and the outer side area of the pole tooth 2 when both circumferential direction faces 33 of the pole tooth 2 are formed so as to be coincided with the normal lines 26 with respect to the center line 22 of the circular space 6 surrounded by the pole teeth 2. However, the portion where the difference is larger is not required to be the entire root part 32 but may be a part of the root part 32. For example, the portion where the difference is larger may be a portion from the upper end of the base 31 to approximately half of the root part 32 in the height direction. Further, the portion which is formed so that the circumferential direction face 33 is faced toward the rotor 7 side in an inclined manner may be all the circumferential direction face 33 of the pole tooth 2.

Further, in the embodiment described above, in a case that the pole tooth 2 is viewed from the exciting coil 4 side in a state that its base 31 is located on a lower side and its tip end 36 is on an upper side, a shape of the left side face is formed in an S-shape and a shape of the right side face is formed in an inverse S-shape. However, the present invention is not limited to this embodiment. For example, instead of forming the S-shape and the inverse S-shape, the side face is formed in a shape comprised of the curve 41 and one straight line which is connected with the curve 41. In addition, in the embodiment described above, a part or all of the center part 34 of the pole tooth 2 is provided with a circumferential direction face 33 which is formed to be a face coincided with a normal line 26, or with a circumferential direction face 33 which is formed so as to face the exciting coil 4 in an inclined manner instead of coinciding with the normal line 26. However, the above-mentioned circumferential direction face 33 may be provided on the tip end part 35 instead of the center part 34. Further, in the embodiment described above, a width dimension of the root part 32 which is a region from the base 31 to the center part 34 of the pole tooth 2 is set to be wider than a magnetized width "W11" of one magnetic pole of the magnet 13 of the rotor 7. However, only a part of the root part 32 may be set wider than the magnetized width "W11" or the entire root part 32 and a part or the entire center part 34 may be set wider than the magnetized width "W11".

Further, in the embodiment described above, the thickness "M2" of the pole tooth 2 is set to be thinner by 15-30% than the thickness "M1" of the ring-shaped part 21 which is extended from the base 31 of the pole tooth 2 toward the outer side in the radial direction. In this case, when the thickness "M2" is set to be thinner by 16-20% than the thickness "M1", the yoke 3 can be further efficiently formed and a diameter of the rotor 7 may be increased or an outer diameter of the stepping motor may be made smaller. In addition, in the embodiment described above, the tip end 36 side of the tip end part 35 of the pole tooth 2 is formed in a semicircular-shaped curve 48 which is protruded in the tip end 36 side direction. However, like a conventional example, the tip end 36 side of the tip end part 35 of the pole tooth 2 may be formed in a straight shape like an upper side of a trapezoid shape.

Further, a small synchronous motor and other types of motors may be applied to the present invention instead of a stepping motor. In addition, the stepping motor 1 is a stepping motor for driving an optical pickup which is used in an ODD. However, the present invention may be applied to a stepping motor for other applications such as a motor for driving a camera lens or for driving a head in HDD or to an AC motor or the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a stator which is provided with a yoke having a plurality of pole teeth, arranged in a circumferential direction, and an exciting coil; and
   a rotor which is disposed in a circular space that is surrounded by the pole teeth;
   wherein a portion, where a circumferential-width difference between an inner side area of the pole tooth facing the rotor and an outer side area of the pole tooth facing the exciting coil is larger than a circumferential-width difference between the inner side area and the outer side area of the pole tooth where both circumferential direction faces of the pole tooth are formed in faces coincided with normal lines with respect to a center line of the circular space surrounded by the pole teeth, is provided on a root part of the pole tooth.

2. The motor according to claim 1, wherein when the pole tooth is viewed from the exciting coil side in a state that a base of the pole tooth is located on a lower side and a tip end of the pole tooth is located on an upper side, a shape of a left side face of the pole tooth is formed in an S-shape and a shape of a right side face of the pole tooth is formed in an inverse S-shape.

3. The motor according to claim 2, wherein the S-shape and the inverse S-shape are formed so that;
a portion from the base to a vicinity of a height center is a straight line or a curve which is bulged toward an outer side so as to form a plural-portion curved shape, and
a portion from the vicinity of the height center to a vicinity of the tip end is formed in a bulged shape toward an outer side by connecting two straight lines with each other or by a curve.

4. The motor according to claim 3, wherein
the plurality of the pole teeth are stood up from a ring-shaped part of the yoke, and
the straight line or the curve which is bulged toward the outer side with the plural-portion curved shape from the base of the pole tooth to the vicinity of the height center is formed so that an inclined degree with respect to the ring-shaped part is set to be smaller in comparison with an inclined degree of a center part of the pole tooth, and
the two straight lines or the curve from the vicinity of the height center to the vicinity of the tip end are comprised of a portion whose inclined degree is larger in comparison with an inclined degree of a root part side and a portion whose inclined degree is substantially the same as the inclined degree of the root part side.

5. The motor according to claim 1, wherein
a root part of the pole tooth is provided with a circumferential direction face which is formed so that a straight line formed by connecting a circumferential direction end of an outer peripheral face of the pole tooth with a circumferential direction end of an inner peripheral face of the pole tooth is directed more toward a center side in a circumferential direction of the pole tooth than the normal line, and
a part or all of a center part of the pole tooth is provided with the circumferential direction face which is formed so as to coincide with the normal line or which is formed to be inclined more toward an exciting coil side than the normal line.

6. The motor according to claim 5, wherein
the plurality of the pole teeth are stood up from a ring-shaped part of the yoke, and
when one of the pole teeth is viewed in a state that a base of the pole tooth is located on a lower side and a tip end of the pole tooth is located on an upper side, at an upper face position of the ring-shaped part, an angle θ1 which is formed by two circumferential direction faces at both ends in the circumferential direction of the pole tooth is set to be larger than an angle θ0 which is formed by two normal lines at both ends in the circumferential direction of an outer peripheral face of the pole tooth.

7. The motor according to claim 1, wherein a width dimension of a root part which is a region reaching from a base to a center part of the pole tooth is wider than a magnetized width of a magnetic pole of a magnet of the rotor.

8. The motor according to claim 7, wherein
the root part of the pole tooth is provided with a circumferential direction face which is formed so that a straight line formed by connecting a circumferential direction end of an outer peripheral face of the pole tooth with a circumferential direction end of an inner peripheral face of the pole tooth is directed more toward a center side in a circumferential direction of the pole tooth than the normal line, and
a width dimension of the root part at circumferential direction ends of the outer peripheral face of the pole tooth is set to be wider than the magnetized width of the magnetic pole of the magnet of the rotor, and
a width dimension of the root part at circumferential direction ends of the inner peripheral face of the pole tooth is set to be narrower than the magnetized width of the magnetic pole of the magnet of the rotor.

9. The motor according to claim 1, wherein a thickness of the pole tooth is set to be thinner by 15-30% than a thickness of a ring-shaped part which is extended from a base of the pole tooth toward an outer side in a radial direction.

10. The motor according to claim 1, wherein a tip end side of a tip end part of the pole tooth is formed in a semicircular-shaped curve which is protruded in a tip end direction.

11. A motor comprising:
a stator which is provided with a yoke having a plurality of pole teeth, arranged in a circumferential direction, and an exciting coil; and
a rotor which is disposed in a circular space that is surrounded by the pole teeth;
wherein the pole tooth is formed so that a width of the pole tooth in the circumferential direction becomes narrower from a base toward a tip end of the pole tooth, and circumferential direction faces of at least a root part of the pole tooth are formed so as to face the rotor in an inclined manner.

12. The motor according to claim 11, wherein
the plurality of the pole teeth are stood up from a ring-shaped part of the yoke, and
when one of the pole teeth is viewed in a state that a base of the pole tooth is located on a lower side and a tip end of the pole tooth is located on an upper side, at an upper face position of the ring-shaped part, an angle θ1 which is formed by two circumferential direction faces at both ends in the circumferential direction of the pole tooth is set to be larger than an angle θ0 which is formed by two normal lines at both ends in the circumferential direction of an outer peripheral face of the pole tooth, and as a result, the circumferential direction faces of at least the root part of the pole tooth are formed so as to face the rotor in an inclined manner.

13. The motor according to claim 11, wherein when the pole tooth is viewed from the exciting coil side in a state that a base of the pole tooth is located on a lower side and a tip end of the pole tooth is located on an upper side, a shape of a left side face of the pole tooth is formed in an S-shape and a shape of a right side face of the pole tooth is formed in an inverse S-shape.

14. The motor according to claim 13, wherein the S-shape and the inverse S-shape are formed so that;
a portion from the base to a vicinity of a height center is a straight line or a curve which is bulged toward an outer side with a plural-portion curved shape, and a portion from the vicinity of the height center to a vicinity of the tip end is formed in a bulged shape toward an outer side by connecting two straight lines with each other or by a curve.

15. The motor according to claim 14, wherein the root part of the pole tooth is provided with a circumferential direction face which is formed so that a straight line formed by connecting a circumferential direction end of an outer peripheral face of the pole tooth with a circumferential direction end of an inner peripheral face of the pole tooth is directed more toward a center side in a circumferential direction of the pole tooth than the normal line, and a width dimension of the root part at circumferential direction ends of the outer peripheral face of the pole tooth is set to be wider than a magnetized width of a magnetic pole of a magnet of the rotor, and a width dimension of the root part at circumferential direction ends of the inner peripheral face of the pole tooth is set to be narrower than the magnetized width of the magnetic pole of the magnet of the rotor.

16. The motor according to claim 15, wherein the plurality of the pole teeth are stood up from a ring-shaped part of the yoke, and the straight line or the curve which is bulged toward the outer side with the plural-portion curved shape from the base of the pole tooth to the vicinity of the height center is formed so that an inclined degree with respect to the ring-shaped part is set to be smaller in comparison with a center part of the pole tooth, and the two straight lines or the curve from the vicinity of the height center to the vicinity of the tip end are comprised of a portion whose inclined degree is larger in comparison with a root part side and a portion whose inclined degree is substantially the same as the inclined degree of the root part side.

17. The motor according to claim 11, wherein a width dimension of a root part which is a region reaching from a base to a center part of the pole tooth is wider than a magnetized width of a magnetic pole of a magnet of the rotor.

18. The motor according to claim 17, wherein the root part of the pole tooth is provided with a circumferential direction face which is formed so that a straight line formed by connecting a circumferential direction end of an outer peripheral face of the pole tooth with a circumferential direction end of an inner peripheral face of the pole tooth is directed toward a center side in a circumferential direction of the pole teeth with respect to the normal line, and a width dimension of the root part at circumferential direction ends of the outer peripheral face of the pole tooth is set to be wider than the magnetized width of the magnetic pole of the magnet of the rotor, and a width dimension of the root part at circumferential direction ends of the inner peripheral face of the pole tooth is set to be narrower than the magnetized width of the magnetic pole of the magnet of the rotor.

19. The motor according to claim 11, wherein a thickness of the pole tooth is set to be thinner by 15-30% than a thickness of a ring-shaped part which is extended from a base of the pole tooth toward an outer side in a radial direction.

20. The motor according to claim 11, wherein a tip end side of a tip end part of the pole tooth is formed in a semicircular-shaped curve which is protruded in a tip end direction.

* * * * *